J. D. TAYLOR.
ELECTRIC SIGNALING SYSTEM.
APPLICATION FILED MAY 27, 1908.
Reissued Dec. 23, 1913. 13,663.
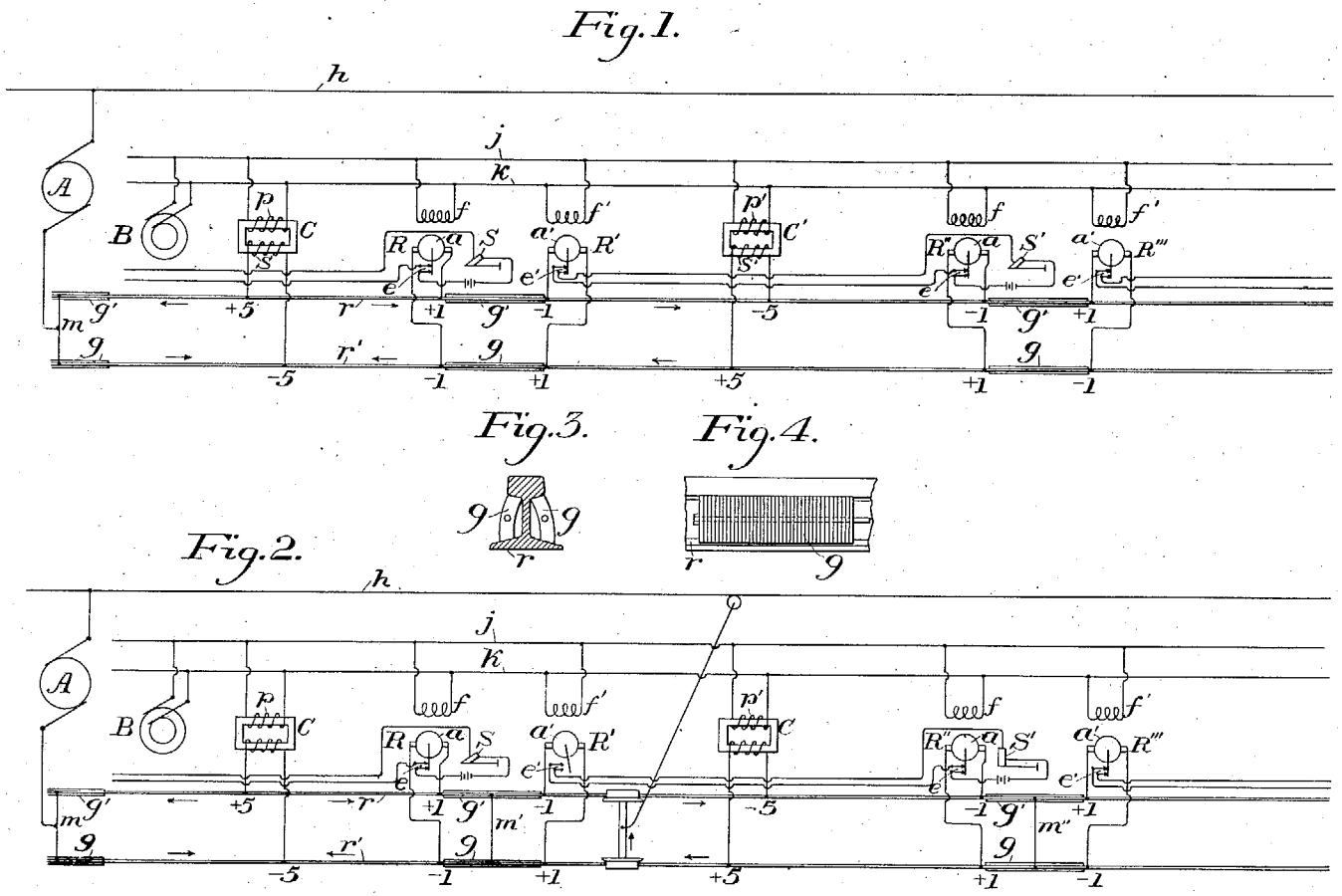
WITNESSES
R. A. Balderson
G. B. Bliming
INVENTOR
Jno. D. Taylor,
by Bakewell, Byrnes & Carnelee,
his Attys.

UNITED STATES PATENT OFFICE.

JOHN D. TAYLOR, OF EDGEWOOD PARK, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTRIC SIGNALING SYSTEM.

13,663. Specification of Reissued Letters Patent. Reissued Dec. 23, 1913.

Original No. 882,276, dated March 17, 1908, Serial No. 413,391. Application for reissue filed May 27, 1908. Serial No. 435,339.

*To all whom it may concern:*

Be it known that I, JOHN D. TAYLOR, of Edgewood Park, Allegheny county, Pennsylvania, have invented a new and useful Electric Signaling System, of which the following is a full, clear, and exact description, reference being had to the accompanying drawings, forming part of this specification, in which—

Figure 1 is a view showing diagrammatically one embodiment of my invention; Fig. 2 is a similar diagram showing the presence of a train in one of the blocks; and Figs. 3 and 4 are detail views showing one way of providing for increased impedance in portions of the track rails.

My invention has relation to block signaling systems, more particularly designed for use on railroads employing electric propulsion and to that class of the said systems in which the track rails instead of being separated into insulated blocks or sections, are electrically continuous for all currents. The terms "blocks" and "sections" as used herein, are therefore not intended to designate actually separated blocks or sections of the track, but are used for convenience to designate the portions of the tracks which are between adjacent signals.

In continuous rail systems which have heretofore been proposed, there has been considerable indeterminateness in the block limits, due to the fact that the exact points at which the signal controlling relays would be shunted or short-circuited by a train, could not be directly located or fixed in all cases by reason of changes in track condition.

An important object of my invention is to provide means in a system of this character for rendering the block limits more determinate; and the broadly novel feature of my invention, in so far as the structural arrangement of the track circuit is concerned, consists in providing the track rails adjacent to the points where the signal controlling relays are connected thereto with portions of increased impedance which operate to more closely confine and localize the points at which the respective relays will be operated by trains.

Another broadly novel feature of my invention with respect to the electrical arrangement of the circuits consists in providing the electrically continuous track rails with sources of supply for signaling currents so connected to the track rails as to produce points of equal or of zero potential between adjacent sources of supply, together with signal controlling relays connected to the track rails at suitable distances from the points of equal or zero potential.

The precise nature of my invention will be best understood by reference to the accompanying drawing diagrams, in which I have shown one embodiment thereof, it being premised, however, that various changes may be made therein by those skilled in the art, without departing from the spirit and scope of my invention, as defined in the appended claims.

In these drawings, the letter A indicates a generator for supplying the propulsion current and which may be either a direct current generator or an alternator. One terminal of this generator is connected to the usual third rail or trolley wire $h$, and the other terminal is preferably connected to a conductor $m$, which connects the two rails of the track.

B is an alternating current generator for supplying the signaling circuit. This generator should be adapted to give a current of considerably higher frequency than the generator which supplies the propulsion current where that generator is an alternator. The current from the generator B is led to the various signaling instruments by means of the line wires or conductors $j$, $k$.

C and C′ designate transformers whose primaries $p$, $p'$ are connected across the conductors $j$, $k$, and whose secondaries $s$, $s'$ are connected across the track rails $r$, $r'$, at as nearly as may be the middle point of the blocks which they respectively supply. The rails $r$, $r'$ are electrically continuous for all currents. Those portions of these rails at or adjacent to each end of each block are provided with means for increasing their impedance, as indicated at $g$, $g'$. This may be conveniently effected by adding iron to each side of the rails between their heads and flanges. This iron is preferably laminated, as shown in Figs. 3 and 4, for the purpose of preventing the current which should flow in the rail from dividing and the part going through the added iron. This added iron acts to increase the impedance of the rails by forming a complete magnetic circuit around the current carried by the rails, and in effect, multiplies their impedance many times. These reinforced sections of the rails are located, as stated, at the ends of the blocks opposite the signals S, S′. The relays which control these signals are connected across the rails at the extreme ends of the reinforced sections. These relays are designated by the letters R, R′, R″, R‴, etc. They are of a type having two elements, one energized from the track circuit, and the other from the line wires *j*, *k*. In the arrangement shown, the armature elements of the relays are connected across the track rails, and their field elements are connected across the line conductors *j*, *k*. The transformers are connected to the rails oppositely, that is to say, the positive terminal of the transformer C is connected to the same track rail as the negative terminal of the transformer C′. The relays between each two transformers are connected to the line and across the track rails in such sense that the current from any transformer except the one intended to operate the relay, will be in the wrong direction to close its contacts, and will, therefore, tend to open its contacts. The arrows in the diagrams indicate the direction of the flow of current at any instant, and the figures preceded by the plus and minus signs indicate the potentials at the various points corresponding to the currents indicated by the arrows. These figures are, however, merely hypothetical, being used for the purpose of illustration only, and may have any values within reasonable limits. The secondary *s* of the transformer C will, at a given instant, produce a potential plus 5, in the illustration given, at its connection with the rail *r*, tending to cause a current to flow in the direction indicated by the arrow; and it may be assumed that the impedance of the rail *r* is such that the fall of potential will be four volts between the point plus 5 and the point plus 1 at the extremity of the reinforced rail section *g*′. From the point plus 1 to the other extremity of the reinforced section *g*′, the potential falls two more volts to minus 1; thence through the rail *r* there is a further drop of four volts to the terminal of the secondary *s*′ of the transformer C′. In the other rail *r*′, the fall of potential is of equal amount, but in the reverse direction. This supposed case gives a difference of two volts of potential, tending to force current through each of the armatures *a*, *a*′ of the relays R, R′. The fields *f*, *f*′ of the same relays are energized from the line conductors *j*, *k* and in such direction that the currents therein coacting with the currents in the armatures derived from the track rails will cause the armatures to move and close the contacts *e*, *e*′.

The end of each of the blocks is similarly equipped, and each signal is controlled by two relays, one at each end of the block, and supplied by current from a transformer between them and the two relays of each block having the contacts controlled thereby in series in the local or signal controlling circuits.

When a train stands on any part of a block section between a relay and the transformer supplying that relay, current is cut off from the relay, and the signal circuit is opened, causing the signal to go to danger. The shunting of each relay will, of course, occur a short time before the train reaches that relay, even when it is not between the relay and its transformer, but by reason of the added impedance due to the iron placed alongside the rails, this distance can be very greatly shortened.

When a train stands between a transformer and the relay, this relay will receive current from the next transformer beyond, but, as can easily be traced from the diagram, this current is in the wrong direction to cause a closing of the relay contacts, and will have a tendency to open the contacts. It will also be readily seen that the middle points of the reinforced rail sections will be at the potential zero. Two opposite zero points may, therefore, be joined by a conductor, if desired, without affecting the signaling current. It is desirable to join these points in this manner for the purpose of preventing as much as possible the unbalancing of the propulsion current. These connections are indicated at *m*, *m*′, *m*″, in Fig. 2.

It will be seen that a train in any portion of any block will always cause the short-circuiting of one of the two relays of this block, and that since these two relays have their contacts in series, in the signal-controlling circuit, that circuit will be held open and the signal guarding the entrance to that block will remain at danger, so long as the block is occupied. In leaving any block, a train before losing control of the last relay of that block gains control of the first relay of the succeeding block, and thereby holds the signal behind the train at danger until such time as it is protected by the signal at the entrance to the next block. The manner in which the relays are affected by the presence of a train will be clearly seen from Fig. 2. By reason of the increased impedance of the end portions of the track rails at the block limits, as herein described, the distances at which adjacent relays of two adjacent blocks will be short-circuited by the train can be very closely determined, so that there will be but a comparatively small overlapping of the blocks.

It will further appear that by the arrangement described, it is impossible for any relay to be operated except by current from the transformer which is intended to operate it. The arrangement of the circuit is made very simple, but few line conductors being required, since the invention permits the use of single-phase currents for the signaling circuits.

It will be obvious that many changes may be made in my invention. Thus, other means may be employed to increase the impedance of the rail, the relays may be of any desired type, and various other changes may be made all within the scope of my invention.

I claim:

1. In a continuous rail block signaling system, means for increasing the impedance of the track rails adjacent to the ends of the blocks, and signal-controlling relays connected to the track rails at opposite sides of the portions thereof of increased impedance, substantially as described.

2. In a block signaling system, track rails which are electrically continuous for all currents, and having portions thereof provided with means for increasing their impedance, means for impressing signaling currents upon the track rails, and signal-controlling relays connected to the track rails adjacent to those portions thereof which are of increased impedance, substantially as described.

3. In a block signaling system, track rails which are electrically continuous for all currents, and which are provided with portions of increased impedance adjacent to the block limits, transformers connected to the track rails substantially midway between the portions thereof of increased impedance, adjacent transformers being oppositely connected to said rails, signal-controlling relays connected to the rails near the ends of the portions thereof of increased impedance, and signals controlled by the relays, substantially as described.

4. In a block signaling system, track rails which are electrically continuous for all currents, said rails having portions of increased impedance, two signal-controlling relays connected across the track rails between each two adjacent portions of increased impedance at points near the ends of such portions, said relays having signal-controlling contacts in series with each other, and a transformer connected to the track rails substantially midway between each two relays, adjacent transformers being oppositely connected to the track rails, substantially as described.

5. In a block signaling system, track rails having portions thereof at and adjacent to the block limits reinforced with laminated iron to increase their impedance, substantially as described.

6. In a block signaling system, track rails having laminated reinforcements of magnetic metal secured to portions thereof at and adjacent to the block limits for the purpose of increasing their impedance, substantially as described.

7. In a block signaling system, electrically continuous track rails having portions thereof at and adjacent to the block limits reinforced by laminated magnetic material between their heads and bases, substantially as described.

In testimony whereof, I have hereunto set my hand in the presence of two witnesses.

JOHN D. TAYLOR.

Witnesses:
M. D. HANLON,
A. G. WILSON.